United States Patent [19]

Chou et al.

[11] Patent Number: 5,858,624
[45] Date of Patent: Jan. 12, 1999

[54] METHOD FOR ASSEMBLING PLANARIZATION AND INDIUM-TIN-OXIDE LAYER ON A LIQUID CRYSTAL DISPLAY COLOR FILTER WITH A TRANSFER PROCESS

[75] Inventors: Hsin-hsin Chou; Michael F. Weber; Cyrus A. Morton; L. Peter Erickson, all of St. Paul, Minn.

[73] Assignee: Minnesota Mining and Manufacturing Company, St. Paul, Minn.

[21] Appl. No.: 710,609

[22] Filed: Sep. 20, 1996

[51] Int. Cl.$^6$ .................................................. G02B 5/20
[52] U.S. Cl. .............................. 430/371; 430/7; 156/233; 156/239; 156/247; 156/275.5; 427/516; 427/162; 427/164; 427/208.2
[58] Field of Search ...................... 430/7, 321; 369/106; 156/230, 233, 237, 239, 247, 275.5; 427/516, 162, 164, 165, 208.2

[56] References Cited

U.S. PATENT DOCUMENTS

| | | | |
|---|---|---|---|
| 3,723,392 | 3/1973 | Konig et al. | 260/75 NP |
| 3,787,210 | 1/1974 | Roberts | 96/27 E |
| 4,156,046 | 5/1979 | Lien et al. | 428/220 |
| 4,587,069 | 5/1986 | Meloy | 264/102 |
| 4,846,905 | 7/1989 | Tarbutton et al. | 525/65 |
| 4,923,860 | 5/1990 | Simons | 503/227 |
| 4,950,696 | 8/1990 | Palazzotto et al. | 522/25 |
| 4,962,081 | 10/1990 | Harrison et al. | 503/227 |
| 4,965,242 | 10/1990 | DeBoer et al. | 503/227 |
| 4,975,410 | 12/1990 | Weber et al. | 503/227 |
| 4,985,340 | 1/1991 | Palazzotto et al. | 430/270 |
| 5,059,701 | 10/1991 | Keipert | 556/13 |
| 5,073,534 | 12/1991 | Harrison et al. | 503/227 |
| 5,086,086 | 2/1992 | Brown-Wensley et al. | 522/25 |
| 5,156,938 | 10/1992 | Foley et al. | 430/200 |
| 5,166,126 | 11/1992 | Harrison et al. | 503/227 |
| 5,171,650 | 12/1992 | Ellis et al. | 430/20 |
| 5,214,541 | 5/1993 | Yamasita et al. | 430/7 |
| 5,252,694 | 10/1993 | Willett et al. | 525/404 |
| 5,262,232 | 11/1993 | Wilfong et al. | 428/327 |
| 5,308,737 | 5/1994 | Bills et al. | 430/201 |
| 5,318,938 | 6/1994 | Hampl, Jr. et al. | 503/200 |
| 5,411,806 | 5/1995 | Dahlquist | 428/411.1 |
| 5,437,912 | 8/1995 | Chou et al. | 428/195 |
| 5,521,035 | 5/1996 | Wolk et al. | 430/20 |
| 5,544,582 | 8/1996 | Bocko et al. | 156/277 |
| 5,614,350 | 3/1997 | Ito et al. | 430/257 |
| 5,635,317 | 6/1997 | Taniguchi et al. | 430/7 |

FOREIGN PATENT DOCUMENTS

| | | |
|---|---|---|
| 0 109 851 | 6/1984 | European Pat. Off. . |
| 0 296 429 A2 | 6/1988 | European Pat. Off. . |
| 0 432 608 A2 | 12/1990 | European Pat. Off. . |
| 0 544 285 A1 | 11/1992 | European Pat. Off. . |
| 0 646 632 A1 | 4/1995 | European Pat. Off. . |
| 0 795 776 A1 | 3/1997 | European Pat. Off. . |
| 2 639 084 | 3/1978 | Germany . |
| 2 706 297 | 8/1978 | Germany . |
| 2 714 084 | 10/1978 | Germany . |
| 2 714 104 | 10/1978 | Germany . |
| 2 721 186 | 11/1978 | Germany . |
| 2 738 154 | 3/1979 | Germany . |
| 2 738 512 | 3/1979 | Germany . |
| 60-222241 | 11/1985 | Japan . |
| 61-32749 | 2/1986 | Japan . |
| 62-144943 | 6/1987 | Japan . |
| 62-180329 | 8/1987 | Japan . |
| 63-60793 | 3/1988 | Japan . |
| 1-149003 | 6/1989 | Japan . |
| 2-213006 | 8/1990 | Japan . |
| 5-177757 | 7/1993 | Japan . |
| 6-912223 | 4/1994 | Japan . |
| 7-104113 | 4/1995 | Japan . |
| 8-220330 | 8/1996 | Japan . |
| 2 083 726 | 3/1982 | United Kingdom . |
| WO 84/03837 | 10/1984 | WIPO . |
| WO 96/01718 | 5/1995 | WIPO . |

OTHER PUBLICATIONS

O'Mara, William C., *Active Matrix Liquid Crystal Displays Part I: Manufacturing Process*, Solid State Technology, Dec. 1991, pp. 65–70.

*Kunststoff–Handbuch*, vol. VII, pp. 45–71 (1966).

Lee et al., *Handbook of Epoxy Resins I*, (1967).

Leitz tiling compensator manual, publication 313.550–057.

Murov, S.L., *Handbook of Photochemistry*, Marcel Dekker, Inc., NY, pp. 27–35 (1973).

Saunders, "Polyurethanes, Chemistry and Technology", *High Polymers, vol. XVI;* vol. I, pp. 32–42, 44–54 (1962).

Saunders, "Polyurethanes, Chemistry and Technology", *High Polymers, vol. XVI;* vol. II, pp. 5–6, 198–199 (1964).

*Bull. Am. Phys. Soc.*, vol. 1, No. 123 (1956).

Bruins, P., *Epoxy Resin Technology*, (1968).

Frisch et al., *Ring–Opening Polymerizations*, vol. 2 (1969).

Hase, T. et al., "Phosphor Materials for Cathode–Ray Tubes", *Advances in Electronics and Electron Phy.*, vol. N79, pp. 271–273 (Academic Press, 1990).

Latham, W.J. et al., "Color Filters from Dyed Polyimides," *Solid State Technology*, (May 1988).

*Primary Examiner*—John A. McPherson
*Attorney, Agent, or Firm*—William D. Miller

[57] ABSTRACT

Optical elements are prepared by the adhesive transfer of at least a low temperature curable (e.g., radiation or room temperature curable) adhesive layer and a conductive layer to a substrate, preferably a transparent, non-birefringent substrate such as ceramic, glass or polymeric film having, for example, a color filter array thereon. The curable adhesive is cured after the curable adhesive layer has been placed into contact with a final receptor surface (e.g., a color filter array on a liquid crystal panel).

18 Claims, 2 Drawing Sheets

METHOD FOR ASSEMBLING PLANARIZATION AND INDIUM-TIN-OXIDE LAYER ON A LIQUID CRYSTAL DISPLAY COLOR FILTER WITH A TRANSFER PROCESS

BACKGROUND OF THE INVENTION

1. Field of the Invention

This invention relates to methods for using adhesive transfer of materials and layers to prepare optical elements or devices, such as liquid crystal display (LCD) panels, CRT screen covers, imaging display covers, and the like. In particular, this invention relates to a method for assembling an optical element comprising at least a crosslinkable adhesive layer (which may also act as a planarization layer) and an optically transparent conductive layer (e.g., an indium-tin-oxide, Indium-Tin-Oxide/Ag/Indium-Tin-Oxide layer) in a color filter element for use in liquid crystal display devices.

2. Description of Related Art

Liquid crystal display devices have competed with phosphorescent display systems and have created their own unique markets. Liquid crystal displays are commonly found in digital imaging systems such as watches, calculators, audio/video equipment, and other electric appliances. Liquid crystal displays provide excellent properties which enable them to compete with other display technologies, and among these properties are low power requirements, small volume needs, little heat generation, and acceptable resolution. Liquid crystal arrays have had to provide color display capability to satisfy the wide range of desirable markets for their use, and coloration has been provided by associating color filters (e.g., flat panel color filters or displays) with the liquid crystals. These color filters transmit only selected and limited wavelengths of radiation (by absorbing the undesired wavelengths), thus allowing light of specified color to pass from the liquid crystal. To provide the best results, color filters are adhered to the surface of liquid crystal display devices as opposed to being merely suspended over the display area of the liquid crystal device. The entire liquid crystal display system usually comprises more than one or two layers, and including the color filter device will generally comprise a first substrate (e.g., glass plate), electrodes, alignment layer, liquid crystal layer, second alignment layer, conductive layer, liquid crystal array, and top substrate (e.g., second glass plate). As shown in U.S. Pat. No. 5,166,126, a binder layer between the conductive layer and the second alignment layer may be present. The association of these layers into a single article can be complex. The deposition of the conductive layer, when made of Indium-Tin-Oxide materials, can be particularly difficult because of the temperatures generated from necessary heat treatment of the layer during annealing. U.S. Pat. No. 5,166,126 uses an adhesive thermal buffer layer between the conductive layer and the liquid crystal display device to reduce the temperature impact of the deposition and treatment of the conductive layer.

U.S. Pat. application Ser. No. 08/273,419, filed Jul. 11, 1994 and U.S. Pat. No. 5,521,035 disclose the use of thermal mass and thermal dye transfer processes to manufacture color filter display panels by the transfer of colorant (dye and/or pigment, with or without a binder) onto a panel to lay over the liquid crystal display.

A series of patents (U.S. Pat. Nos. 4,965,242, 4,962,081, 4,975,410, 4,923,860, 5,073,534, and 5,166,126) disclose the use of thermal dye diffusion transfer to make filter elements and color filter constructions. U.S. Pat. Nos. 4,965,242 and 5,073,534 teach the use of high $T_g$ polycarbonate and polyester receiving layers to accept the thermally transferred dye. With both receiving layers, a vaporous solvent treatment is required to drive the dye into the receiving layer.

For a color filter element to be useful as a component of certain types of optical display devices, including for example liquid crystal and phosphorescent displays, the color filter array is preferably coated with a planarizing layer. This planarizing layer (which, amongst other objectives, levels or smooths the surface of the color filter element for acceptable placement of subsequent layers) is usually followed by a coating of a transparent conductor, commonly indium tin oxide (ITO). The conductive layer may or may not be patterned, and is preferably a continuous layer. Finally, an alignment layer, typically a thermoplastic resin such as a polyamide, is applied onto the conductive layer. The alignment layer is typically patterned (e.g., by brushing) to control the alignment of the liquid crystal material in the functioning display.

The substrate may be any substance upon which a color filter or the like is desired to be formed. Preferably the substrate is a transparent (at least light transmissive) substrate, such as glass, polymer film, and the like. When glass is the substrate, the use of glass treated with silane coupling agents (e.g., 3-aminopropyltriethoxysilane) may be useful to increase adhesion of the colorant layer. Possible substrates include glass, polyester base (e.g., polyethylene terephthalate, polyethylene naphthalate), polycarbonate resins, polyolefin resins, polyvinyl resins (e.g., polyvinyl chloride, polyvinylidene chloride, polyvinyl acetals, etc.), cellulose ester bases (e.g., cellulose triacetate, cellulose acetate), and other conventional polymeric films used as supports in various imaging arts. Transparent polymeric film base of 2 to 100 mils (e.g., 0.05 to 2.54 mm) is preferred. If the substrate is a polymeric film, it is preferred that the film be non-birefringent so as not to interfere with the operation of the display in which it may be integrated. Preferred examples of non-birefringent substrates are polyesters that are solvent cast. Typical examples of these are those derived from polymers consisting or consisting essentially of repeating, interpolymerized units derived from 9,9-bis-(4-hydroxyphenyl)-fluorene and isophthalic acid, terephthalic acid or mixtures thereof, the polymer being sufficiently low in oligomer (i.e., chemical species having molecular weights of about 8000 or less) content to allow formation of a uniform film. This polymer has been disclosed as one component in a thermal transfer receiving element in U.S. Pat. No. 5,318,938. Another class of non-birefringent substrates are amorphous polyolefins (e.g., those available under the trade designation Zeonex from Nippon Zeon Co., Ltd.). The most preferred substrate is glass. It is preferred that this glass be 0.5 to 2.0 mm thick. Especially preferred thicknesses are 0.7 and 1.1 mm.

The colors to be deposited on the substrate sheet for the color filter element may comprise any color material which can be deposited with adherence to the substrate. In a preferred embodiment, the colorant is in a suitable binder system and is solvent coated.

When pigments are used as the color material, they are preferably transparent. Examples of transparent pigments that can be used in this invention include those available under the trade designation RS Magenta 234-0077, GS Cyan 249-0592, and RS Cyan 248-0615Ô from Sun, those available under the trade designation GS Yellow GG11-1200, BS Magenta RT-333D, Microlith Yellow 3G-WA, Microlith Yellow 2R-WA, Microlith Blue YG-WA, Microlith Black C-WA, Microlith Violet RL-WA, and Microlith Red RBS-WA from Ciba-Geigy, those available under the trade designation Heucotech Aquis II and Heucosperse Aquis III from Hoerchst, and the like. A preferred method of inserting or depositing the colors on the matrix is by laser induced mass transfer, including both a "melt stick" or an ablative transfer process in which a donor sheet having the colors thereon is used to transfer colors onto the substrate. "Ablative transfer" refers to a process in which a medium is ablated in thermal imaging processes by the action of a thermal source, through the rapid removal of material from the surface, but without sublimation of the material. Such donor sheets are known in the art for direct image forming, but are not believed to have been shown for use in the formation of color filters.

Thermal mass transfer of colorant onto a support is a significant improvement over dye (e.g., sublimation) transfer in forming color filter elements. The colors are more durable with respect to both abrasion and color fading (when pigments are used). The transferred mass material carries its own binder and can be applied to a greater range of substrate materials. No post-treatment of the transferred mass colorant is needed as may be required for dye transferred materials used in color filters of the prior art (e.g., U.S. Pat. Nos. 4,965,242 and 5,073,534).

A general description of color filters for liquid crystal displays is given in C. C. O Mara, *Liquid Crystal Flat Panel Display: Manufacturing Science and Technology,* Van Norstrand Reinhold, 1993 p. 70. Several fabrication methods are disclosed. The most common method for preparing color filters is using photolithographic techniques. One photolithographic process is detailed in an article entitled *Color Filters from Dyed Polyimides,* W. J. Latham and D. W. Hawley, Solid State Technology, May 1988. This paper shows the complex, multi-step nature of the photolithographic process. By comparison, this invention provides a much simpler process for making a color filter array.

The shapes of the color elements may be simple geometric objects such as rectangles, squares or triangles. Alternatively, for some configurations of color filters, the color elements may be created as stripes. Another common configuration for a color filter array is when the color elements in one row are displaced by one element in the second row and by two elements in the third row such that the color elements are diagonally aligned.

The dimensions of the discrete elements can range from 5–1000 microns. More typically the dimensions are on the order of 50–300 microns. These dimensions are easily produced by photolithographic and laser imaging techniques.

The colors used to form the color filter are generally the primary additive colors, i.e. red, green, and blue. Each of these primary colors preferably has high color purity and transmittance, and, when combined, an appropriate white balance. The color filters preferably have spectral characteristics of red, green, and blue that show chromaticity close to the National Television Standards Committee (NTSC) standard colors indicated by the Commission International de l'Eclairage (CIE) chromaticity diagram. Although red, green, and blue are the most common colors for the filters, other color combinations may be used for specialty applications. In some cases, the repeat sequence in a row is red:green:blue. For other applications the repeat sequence in a row is red:green:green:blue.

There are many transparent electrically conducting laminate elements described in the literature. However, there are no mentions of optically transparent, electrically conducting films with a release liner on a curable adhesive layer. A Kokai Patent Application No. HEI 5[1993]-177757 discloses a light shield film comprising a laminate construction containing the following layers in the order listed: 1) a transparent film base, a heating layer which in the examples is an ITO layer, a moisture proof $SiO_2$ layer, a sol-gel layer which undergoes a transition from a transparent to scattering when heated, and another transparent film. Kokai Patent Application No. HEI 2[1990]-213006 (Nitto Electric Corp.) teaches the construction of transparent, conductive laminates. These films are prepared by depositing a conductive film on one side of a transparent film substrate and a dielectric layer onto the conductive layer; the other side of the substrate layer is then coated with a transparent adhesive. The dielectric layer serves the dual purpose of protecting the conductive layer from scratching and also reduces reflection from the surface. The adhesives discussed are acrylics, for example a copolymer of butylacrylate, acrylic acid and vinyl acetate which has been crosslinked with an isocynate type crosslinking agent. The final construction is prepared by bonding the adhesive layer to a thicker transparent support layer such as a polyester. The adhesive properties are chosen to provide a cushioning effect. This patent application differs from our invention in that a curable adhesive is used in our invention and a release liner is used instead of the transparent support layer. Kokai Patent Application No. HEI 1[1989]-149003 discloses laminates for VDT filters. The laminates are prepared by bonding a number of layers together using a crosslinkable ethylene copolymer adhesive. The ethylene copolymers include ethylene-vinylacetate, ethylene-methacrylate copolymer, ethylene methacrylic acid copolymer, ethylene-ethylmethacrylate copolymer, ethylene methylacrylate copolymer, metal ion crosslinked ethylene-ethylmethacrylic acid copolymer, partially saponified ethylene-vinyl acetate copolymer, and carboxylated ethylene vinyl acetate copolymer. The crosslinking of these polymers can be accomplished using heat or light. One method detailed in the patent application is the use of these polymers with an initiator system consisting of organic peroxides. The multifunctional acrylates, or allyl oligomers can also be used in this invention. Adhesive accelerators such as silane coupling agent containing epoxy groups or acrylates may also be present. For light induced crosslinkable systems a sensitizer is provided. To prevent blocking it was necessary to emboss the adhesive surface. The use of a release liner obviates the need for the embossing step. Another Kokai Patent Application No. SHO 62[1987]-180329 involves a construction discloses the use of a laminate construction comprising a transparent conductive layer, polymeric substrate layer, an optional primer layer, a ethylene-vinyl alcohol containing layer, and a thermoset containing layer. The purpose of the thermoset layer is to protect the EVA layer in subsequent etching steps performed on the ITO layer. Other laminate constructions are described in Kokai Patent Application No. SHO 60[1985]-222241 wherein a transparent substrate layer is coated with a curable composition to improve the hardness of the laminate construction. In all the examples the curable layer is completely cured and as such is not suitable for laminating to another optical element without application of an adhesive. Other less relevant laminate constructions are described in Kokai Patent Application No. SHO 61[1986]-32749 and Kokai Patent Application No. SHO 62[1987]-144943.

In Kokai Patent Application No. HEI 6[1994]-91223 the use of a release material is disclosed in a method for smoothing polymeric films to prevent the formation of irregular patterns. The specific example cited is the formation of a planarized surface on a color filter element. The process involves bonding a resin film on a base or substrate layer and then depositing a release film on top of the resin layer by applying pressure and heat to smooth the surface. The release film is then removed. The release layer is comprised of a base layer, a conductive layer and an adhesive layer (on the conductive layer). The present invention will be shown to differ significantly from the above invention. The polymer layer is in contact with the release layer, and the conductive layer is the top layer in the Kokai Patent Application No. HEI 6[1994]-91223, whereas, in the present invention the conductive layer is covered by the adhesive layer. Also, the conductive layer need not be transparent in their invention, as carbon black is listed as a possible conductive layer.

There is also a Kodak patent that discuss laminate ITO layers with an associated color filter U.S. Pat. No. 4,965,242. In this construction, a temporary support layer is laminated to a polymeric alignment layer on top of a transparent conducting layer. In this case, the polymeric alignment layers are polyimides, polyvinylalcohols and methyl cellulose. The temporary support layer is a Kaptan resin (a polymer of the diimide of pyromellitic acid and 4,4'-oxyaniline).

SUMMARY OF THE INVENTION

A requirement for many display applications is an optically transparent, electrically conducting layer. For the most part, this layer is constructed in a step-wise fashion wherein one of the steps is a vapor deposition of the electrically conductive layer, usually indium tin oxide (ITO) because of its unique optical clarity, thermal stability and oxidative stability. Another step in the application of these electrically conductive layers involves an annealing process, often at high temperatures, to obtain suitable conductive properties in the ITO layer. The deposition of the ITO and subsequent annealing place severe restrictions on the nature of the materials that may be used in layered structures which must be exposed to these process steps. For example, in the case of color filters, the specific binders and the colorants are limited by the temperatures required for annealing, often at temperatures of 200° C. or greater. There is a need for a transparent colorless layer that can be adhered to an optical element such as a color filter element at lower temperatures (<200° C.) so that the substrate and associated materials are not thermally damaged or impaired.

The present invention describes an article comprising 1) a releasable support substrate, 2) an optically transparent, electrically conducting film and 3) a crosslinkable adhesive layer, with the optional support substrate removed or left in place. An optional alignment layer may be placed between the conductive layer and the release surface, thereby providing a three-layer transferable system of (from the outermost layer after transfer) an alignment layer, conductive layer and crosslinkable adhesive layer. The unique features of this invention are the aforementioned constructions and the functional nature of the crosslinkable adhesive layers used to bond the optically transparent, electrically conducting film to the optical element. The advantage of the constructions of this invention are that an optically transparent, electrically conducting film may prepared and annealed prior to attachment to the optical element (even at temperatures above 200° C. which would be capable of damaging he optical elements), a photocurable or other low temperature curing adhesive is used to associate the annealed layer to the optical element (e.g., liquid crystal display panel) and therefore the optical element need not be exposed to damaging temperatures. Another aspect to this invention is the possibility of creating this transferable element using web processing (coating) or screen coating techniques which offer the advantage of significant cost reductions. Other aspects to this invention are the use of special optically clear, yet multiphase adhesives that can be transformed into crosslinked (variously known as thermoset, three-dimensional, cured, or photocured) polymers that will not separate into optically distorting phases. The present invention may use primarily liquid adhesives in the formation of the adhesive layers, although adhesives in any state are contemplated. By liquid it is meant that at room temperature the adhesive will flow under shear forces (e.g., with a 10 $cm^2$ polyester film in contact with the adhesive with a 0.5 lb/sq. in. (about 3500 $N/m^2$) vertical force, the polyester film will not move more than 1 cm/sec. with a 200 g horizontal force component applied to the film. Preferably the film will move at that speed when the same forces are applied at 20° C. The lower the temperature at which the film will move indicates the greater fluidity (lower shear force resistance) of the adhesive.

The present invention describes a method for providing a conductive layer to a substrate such as an optical element by providing a transferable element comprising at least a crosslinkable adhesive layer and a conductive layer, adhering the adhesive layer of the transferable element to a receptor, then crosslinking the adhesive layer. By depositing the conductive layer on a temporary substrate (where thermal processing can be effected on an thermally inert base) and then subsequently applying the adhesive to the finished (e.g., annealed, hardened, polished, roughened, etc.) conductive layer, the entire thermal treatment which is of concern to the integrity of the ultimate base (the optical element) or support materials for the conductive layer is removed from the support and damage is avoided.

DETAILED DESCRIPTION OF THE INVENTION

For a color filter element to be useful as a component of certain types of liquid crystal displays, the color filter array is covered with an optically transparent conductive layer and is preferably coated with a planarizing layer, a layer which smooths and/or levels the surface of the underlying layer. The application of this planarization layer is usually followed by a coating of a transparent conductor, commonly an indium tin oxide (ITO) layer (alone or in combination with other layers, or materials e.g., silver). The conductive layer may or may not be patterned, but is usually smooth to assure even conductivity. Finally, an alignment layer, typically a thermoplastic polymer such as a polyamide, is applied onto the conductive layer. The alignment layer is typically patterned (e.g., by brushing) to control the alignment of the liquid crystal material in the functioning display.

In the formation of a liquid crystal display or phosphorescent display, the underlying substrate may be any substance upon which a color filter or the like is desired to be formed. Preferably the substrate is a transparent (at least light transmissive) substrate, such as glass, polymer film, and the like. When glass is the substrate, the use of glass treated with silane coupling agents (e.g., 3-aminopropyltriethoxysilane) may be useful to increase adhesion of the colorant layer. Possible substrates include glass, polyester base (e.g., polyethylene terephthalate, polyethylene naphthalate), polycarbonate resins, polyimides, polyolefin resins, polyvinyl resins (e.g., polyvinyl chloride, polyvinylidene chloride, polyvinyl acetals, etc.), cellulose ester bases (e.g., cellulose triacetate, cellulose acetate), and other conventional polymeric films used as supports in various imaging arts. Transparent polymeric film base of 2 to 100 mils (e.g., 0.05 to 2.54 mm) is preferred. If the substrate is a polymeric film, it is preferred that the film be non-birefringent so as not to interfere with the operation of the display in which it is to be integrated. When polymeric films are chosen as the substrate, it is sometimes desirable to have an adhesive layer on the substrate to maximize the transfer of the colorant layer. Preferred examples of non-birefringent substrates are polyesters that are solvent cast. Typical examples of these are those derived from polymers consisting or consisting essentially of repeating, interpolymerized units derived from 9,9-bis-(4-hydroxyphenyl)-fluorene and isophthalic acid, terephthalic acid or mixtures thereof, the polymer being sufficiently low in oligomer (i.e., chemical species having molecular weights of about 8000 or less) content to allow formation of a uniform film. This polymer has been disclosed as one component in a thermal transfer receiving element in U.S. Pat. No. 5,318,938. Another class of non-birefringent substrates are amorphous polyolefins (e.g., those available under the trade designation Zeonex from Nippon Zeon Co., Ltd.). The most preferred substrate is glass. It is preferred that this glass be 0.5 to 2.0 mm thick. Especially preferred thicknesses are 0.7 and 1.1 mm.

A requirement for many display applications is an optically transparent, electrically conducting layer. For the most part, this layer is constructed in a step-wise fashion wherein one of the steps is a vapor deposition of the electrically conductive layer, usually indium tin oxide (ITO) because of its unique optical clarity, thermal stability and oxidative stability. Another step in the application of these electrically conductive layers involves an annealing process, often at high temperatures, to obtain suitable conductive properties in the layer. The deposition of the ITO and subsequent annealation place severe restrictions on the nature of the materials that may be used in layered structures which must be exposed to these process steps. For example, in the case of color filters, the specific binders and the colorants are limited by the temperatures required for annealation.

The present invention describes as a transfer element in the manufacture of optical elements an optically transparent, electrically conducting film which has a crosslinkable adhesive layer (and preferably a release liner on the backside of the conductive layer, and where the adhesive is not applied in-line in the process directly before application of the preformed conductive layer to the color filter, a release liner on the adhesive layer such that the release layer can be stripped-off) the optically transparent, electrically conducting composite film applied to an optical element. The unique features of this invention are the aforementioned constructions and the functional nature of the crosslinkable adhesive layers used to bond the (preferably optically transparent) electrically conducting film to the optical element. The advantage of the constructions of this invention are a) that an optically transparent, electrically conducting film is prepared and thermal processed (e.g., annealing) prior to attachment to the optical element, b) a photocurable or other low temperature curing adhesive is used to associate the annealed layer to the optical element (e.g., liquid crystal display panel) and c) therefore the optical element need not be exposed to the elevated temperatures desirable in the preparation of preferred conductive layers. Another aspect to this invention is the possibility of creating this transferable element using web processing techniques which offer the advantage of significant cost reduction. Other aspects to this invention are some special optical adhesives that can be transformed into crosslinked polymers that will not separate into optically distorting phases. Preferably the adhesive at room temperature will flow under mild shear forces (e.g., with a 10 cm$^2$ polyester film in contact with the adhesive with a 0.5 lb/sq. in. (3500 N/m$^2$) force, the polyester film will not move more than 1 cm/sec. with a 200 g horizontal force applied to the film).

The present invention relates to processes and materials for the formation of optical elements comprising a substrate having adhered thereto at least an electrically conductive layer and the crosslinkable adhesive layer (which is ultimately a crosslinked layer), the substrate having the conductive layer being adhered to the substrate by a transfer process using the adhesive layer to secure the layers to the substrate. An alignment layer (usually comprising a thermoplastic polymer such as a polyamide) is often on the other side of the conductive layer from the adhesive layer. One manner of effecting this process is to provide a temporary receptor layer (with release properties, as provided by a release layer or release coating on the temporary carrier), optionally to coat an alignment layer onto the release surface (e.g., by vapor deposition, sol drying, etc.), to deposit an electrically conductive layer (e.g., Indium-Tin-Oxide, Alumina/ITO, AgITO, mixtures, solid solutions and blends of metals and metal oxides, preferably transparent layers of these materials, etc.) onto the temporary substrate, to overlay a curable (e.g., photocurable) layer on the conductive layer, to place the curable (crosslinkable) layer against the substrate, then curing the curable layer. It is possible to initiate cure of the crosslinkable layer before placing the adhesive layer against the permanent substrate, as some adhesive systems have a delayed cure time. This is not particularly advantageous, but has actually been performed with some of the benefits of the present invention. The biggest drawback of this effort is the tendency for the adhesive to be less flowable as crosslinking progresses, which reduces penetration of the adhesive into any open areas (e.g., between raised image features in the color filter). Careful viscosity controls and appropriate timing during the curing process can alleviate these problems. The temporary layer may be removed before the curing step, but even if the curable layer is photocurable, the process may be practiced without first removing the strippable layer. If the temporary layer is transparent or if the substrate is transparent, the temporary layer may be stripped after photocuring or even left on as an optional layer if it has desirable properties (e.g., oxygen or solvent barrier resistance). Radiation exposure would be effected through either or both of the transparent layers.

The present preferred photocurable layer is not merely a photopolymerizable layer, but must be capable of providing three-dimensional polymerization (curing or crosslinking) to provide the thermal, physical (e.g., dimensional) and solvent stability needed for the optical element. There are a wide variety of photocurable materials available which can photocrosslink and provide optical properties needed in the optical elements. Among the many classes of materials which can meet these needs are (meth)acrylates (e.g., poly (meth)acrylates with more than one (meth)acryloyl functionality [e.g., 2–8 acryloyl functionalities] per molecule or with additional crosslinking agents; polyepoxy resins; polysiloxanes; and the like with three dimensional crosslinking). The curable or photocurable materials may be applied and used in the process as liquid coating compositions which are dried to a sufficiently stable condition to allow movement of the coated conductive layer to the substrate. When dried, at room temperature the adhesive will flow under shear forces (e.g., with a 10 cm$^2$ polyester film in contact with the adhesive with a 0.5 lb/sq. in. (3500 N/m$^2$) force, the polyester film will not move more than 1 cm/sec. with a 200 g horizontal force applied to the film. This is still considered to be a liquid adhesive according to the practice of the present invention.

As noted before, different materials may be used as the conductive layer, but it is important to note that a high level of conductivity is desirable. It is preferred that a conductivity of at least 0.01 mohs/square is provided by the conductive layer. This can best be provided by the use of Indium-Tin-Oxide layers and laminates (e.g., with silver), and this type of conductive layer is presently the conductive layer of choice for optical elements because of its many excellent properties, including dimensional stability, thermal stability, optical clarity, and the like, as well reported in the literature.

Irradiation of the photocurable composition may be effected by any radiation source which emits wavelengths which can induce the crosslinking/polymerization of the photocurable layer. Lasers, broad spectrum emitters (banks of UV lamps), light emitting diodes, flash lamps, and any other useful radiation source may be used. The compositions may be exposed to radiation to which they are natively sensitive (usually UV radiation) or may be spectrally sensitized as is well understood in the art by the addition of spectral sensitizing dyes. In this manner, it is particularly desirable to spectrally sensitize the photocurable composition to wavelengths outside the visible spectrum so that coloration is not added to the optical element. The use of UV or infrared radiation spectral sensitizers can easily effect this result. The use of spectral sensitizers which provide less than 0.3 optical density for the curable layers of the invention at a thickness between 0.3 and 50 micrometers within the visible range of the electromagnetic spectrum is particularly desirable.

The liquid photocurable coating compositions may be applied by any conventional liquid application method, including but not limited to gravure coating, curtain coating, slot coating, spin coating, screen coating, brush or roller coating, and the like. If the curable adhesive layer is first formed on one temporary substrate, it may be dried then laminated to the conductive layer while the conductive layer is on yet another temporary substrate. The thickness of the layer is in part dependent upon the nature of the materials used and the specific properties desired in the layers, but those properties and the relationship of thickness to the properties are well understood in the art. The temporary substrate may be of any dimension, the conductive layer may range, for example, from 0.1 to 100 micrometers, the photocurable layer may range from 0.3 to 100 micrometers.

One of the benefits of the photocurable layer is that it can function as an alignment layer or planarization layer (as the layer is alternatively described in the art) with respect to other layers or elements which are adjacent to the optical element.

EXAMPLES

Example 1. Preparation of ITO/Ag/ITO Layer on a Donor Substrate

A SiO$_2$ sol available from Nalco under the trade designation Nalco 2326 was diluted in ETOH to make a 4% sol. The SiO$_2$ sol was then coated on a 3-mil (0.008 cm) PET using a #5 Meyer bar to form the donor substrate. Ten such samples were made with 4'×6' (10 cm×15 cm) dimension. They are mounted with tape on a polycarbonate carrier web with SiO$_2$ facing outside. Samples were degassed in vacuum by exposure to a 150° C. heater. Coatings were deposited when the web passed the sputtering chamber in the following sequence.

1. Adhesor (primer) : 20 Å Si.
2. ITO layer was sputter coated with 90% In$_2$O$_3$ and 10% SnO$_2$ onto the SiO$_2$ coated polyethyleneterephthalate substrate
   Thickness 350 Å
   Pressure 8.0 mT
   310 W
   Speed at 14.5 inch/min
3. Ag—sputtered
   Thickness 100 Å
   Pressure 8.0 mT
   180 W
   Speed 37.5 inch/min. (95.3 cm/min)
4. ITO layer; same as layer #2.

After coating, the sheet resistance was measured to be 9 ohm/square.

Example 2. Preparation of Optimum Release Coating and Photopolymers for Polymerization Transfer To simulate ITO transfer without having to go through all those laborious coating sequence, Al films were vapor coated through resist heating on various release coats on 3-mil (0.008 cm) PET films. They were then overcoated with several different photopolymers, laminated onto 7-mil (0.018 cm) PET films, subjected to UV curing and peeled apart to determined whether the Al films were properly transferred intact. Conductance of each film was measured before and after transfer to determine whether the transfer was complete beside visual inspection.

In the following examples: The SiO$_2$ sol layer from Nalco is coated, Al is vacuum coated on top, conductance is measured from backside in marked circle, photopolymers are coated and each is laminated to the same sample of Nalco and Al. All are UV cured in a vacuum for 1.5 minutes, circles are redrawn on the other side, samples are peeled, and conductance is remeasured. HAA was coated at 30% wt. with #4 Meyer bar. Norland 61 and 81 were coated at 20% wt. with #6 and Lite Fast 300 at 100% wt. with #3 Meyer bar. In coating HAA and Norland photopolymer, a 3% wt. Irgacure 369 photo-initiator was added to the solution.

| Release in ETOH Nalco 2326 | Al Thickness | Photopolymer | Conductance Before Lamination | Conductance After UV | Comments |
|---|---|---|---|---|---|
| .2% # 5 | 170 Å | HAA | 0.056 | | Mostly transferred |
| .2% # 5 | 170 Å | Norland 61 | 0.054 | 0.0415 | Big specks missing (due to dust) |
| .2% # 5 | 170 Å | Lite Fast 300 | 0.0515 | | No transfer |
| .2% # 5 | 230 Å | HAA | 0.305 | | No transfer |
| .2% # 5 | 230 Å | Norland 61 | 0.0675 | | No transfer |
| .2% # 5 | 230 Å | Lite Fast 300 | 0.0775 | | No transfer |
| .2% # 5 | 295 Å | HAA | 0.2421 | | Less than ½ transfer, looks good where it transfers |
| .2% # 5 | 295 Å | Norland 61 | 0.2852 | 0.2815 | Nice transfer |
| .2% # 5 | 295 Å | Lite Fast 300 | 0.177 | | Almost no transfer |
| .5% # 5 | 250 Å | HAA | 0.1704 | 0.1073 | Dust leaves round spots missing in transferred sheet |
| .5% # 5 | 250 Å | Norland 61 | 0.223 | 0.136 | Nice |
| .5% # 5 | 250 Å | Lite Fast 300 | 0.1645 | | Inconsistent transfer over whole sheet |
| .5% # 5 | 160 Å | HAA | 0.0482 | 0.0426 | Dust leaves round spots missing in transferred sheet |
| .5% # 5 | 160 Å | Norland 61 | 0.0066 | 0.0081 | Good transfer, surface wavier than HAA |
| .5% # 5 | 160 Å | Lite Fast 300 | 0.0343 | | Over ½ transferred in nice sheet |
| 1% # 5 | 250 Å | HAA | 0.195 | 0.1309 | Dust leaves round spots missing in transferred sheet |
| 1% # 5 | 250 Å | Norland 61 | 0.2395 | 0.2321 | Dust leaves round spots missing in transferred sheet |
| 1% # 5 | 250 Å | Lite Fast 300 | 0.148 | | Almost transferred |
| 2% # 5 | 260 Å | HAA | 0.174 | 0.1356 | Dust leaves round spots missing in transferred sheet |
| 2% # 5 | 260 Å | Norland 61 | 0.2456 | 0.2357 | Nice transfer, surface not as smooth as HAA |
| 2% # 5 | 260 Å | Lite Fast 300 | 0.184 | 0.1764 | Transfer is very complete except dust particles |
| 2% # 5 | 200 Å | HAA | 0.156 | 0.0425 | |
| 2% # 5 | 200 Å | Norland 61 | 0.0607 | 0.0673 | Norland is most complete transfer of these three |
| 2% # 5 | 200 Å | Lite Fast 300 | 0.0692 | 0.055 | |
| 4% # 5 | 260 Å | HAA | 0.144 | 0.1371 | Dust leaves round spots missing in transferred sheet |
| 4% # 5 | 260 Å | Norland 61 | 0.206 | 0.1984 | |
| 4% # 5 | 260 Å | Lite Fast 300 | 0.1813 | 0.1793 | Dust does not make such big holes |
| 4% # 5 | | HAA | | | Laminated to wrong side |
| 4% # 5 | 200 Å | Norland 61 | 0.111 | 0.1075 | Nalco pattern shows through in sample below |
| 4% # 5 | 200 Å | Lite Fast 300 | 0.0643 | 0.0532 | Transfer is complete, smaller dusk holes than in HAA |
| 5% # 5 | 230 Å | HAA | 0.034 | 0.0297 | Nalco patterns visible through Al |
| 5% # 5 | 230 Å | Norland 61 | 0.0623 | 0.052 | Nalco pallerns visible through Al |
| 5% # 5 | 230 Å | Lite Fast 300 | 0.0665 | 0.0665 | Nalco patterns visible through Al |
| 5% # 10 | 295 Å | HAA | 0.002 | | Nalco does not show through on these three |
| 5% # 10 | 295 Å | Norland 61 | 0.0144 | 0.0091 | Transfer is very nice |
| 5% # 10 | 295 Å | Lite Fast 300 | 0.0224 | 0.0155 | Transfer has large specks missing |
| .5% # 5 | 260 Å | HAA | 0.2366 | 0.222 | Great transfer |
| .5% # 5 | 260 Å | Norland 61 | 0.1809 | 0.1728 | |
| 1% # 5 | 160 Å | Norland 81 | 0.0606 | 0.0155 | A lot of holes from dust |
| 2% # 5 | 150 Å | Norland 81 | 0.1573 | 0.1292 | Same bumpy surface as with Norland 61 |

The last four examples were done the same as above, except that the UV exposure was done through a polycarbonate film with an ITO coating face down, so they were exposed for 2 minutes.

* HAA: Hydantoin Hexaacrylate a 3M photopolymer #41-4202-1283-3.
* Norland 61 & 81, Photo epoxys available from Norland Products Inc., New Brunswick, N.J.
* Lite Fast 300, 100% Acrylic photopolymer available from MLT/Micro-LITE Technology, Mesa, Ariz.

All UV exposures were performed with a vacuum printer available from 3TC Ascor using the high energy output of a high pressured Hg lamp. The power density was rated at $5.7 \times 10^{-2}$ W/cm$^2$ at a wavelength of 0.365 $\mu$m It is seen that Nalco 2326 starts to release nicely at coating thickness beyond "0.5% #5" and HAA seems to be the polymer of choice for the next set of experiments.

Figure 1:
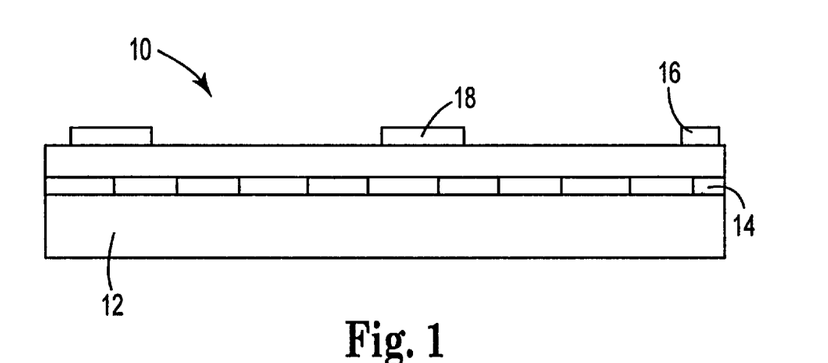
FIG. 1 is an end view of a color filter element produced by laser induced thermal imaging using an infrared (IR) laser.

Example 3. Photopolymerization Transfer of "ITO" Layer to Color Filters (I) "Color Filter Assembly" prepared through IR laser Laser Induced Thermal Imaging (LITI) Process Ia. A full "color filter assembly" was prepared with color filter elements on a Black-Aluminum matrix on a 4-mil (0.010 cm) PET substrate according to the process steps described in detail in, for example, U.S. Pat. No. 5,308,737. The resulting color filter element 10 is shown in FIG. 1, and includes a PET substrate 12, a black layer 14, a pigment receiving layer 16, and a pigmented layer 18.

Figure 2:
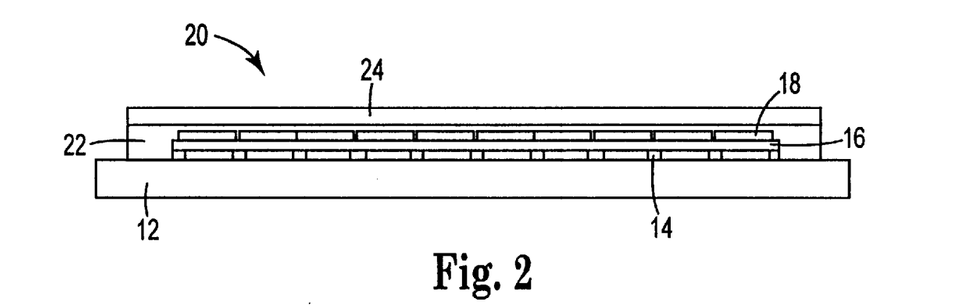
FIG. 2 is an end view of a color filter assembly made from the color filter element of FIG. 1.

I*b*. A 4'×6' (10 cm×15 cm) ITO/Ag/ITO on release layer on a PET substrate film made according to Example 1 was overcoated with HAA photopolymer (30% wt., #3 Mayer bar) and oven dried at 80° C. for 1 minute. The photopolymer film was then pressure laminated to the color filter element prepared in I*a*. It was then UV exposed in the same manner described in Example 2 through the ITO/Ag/ITO side for 2 minutes to form a photopolymer planarization layer. The ITO carrier substrate was peeled away, and he ITO layer was properly transferred and adhered on the color filter element to form an actual color filter panel 20 as shown in FIG. 2. The color filter panel 20 shown in FIG. 2 includes a photopolymer planarization layer 22 and an ITO layer 24. The surface resistivity of the panel was measured to be 10 ohm/square, the same as before transfer.

(II) "Color filter assembly" prepared through electrophoretical process.

II*a*. A full "color filter assembly" was prepared with color filter strips and black matrix on a glass substrate according to a known electrophoretic toning process steps illustrated schematically in FIG. 3.

Figure 3:
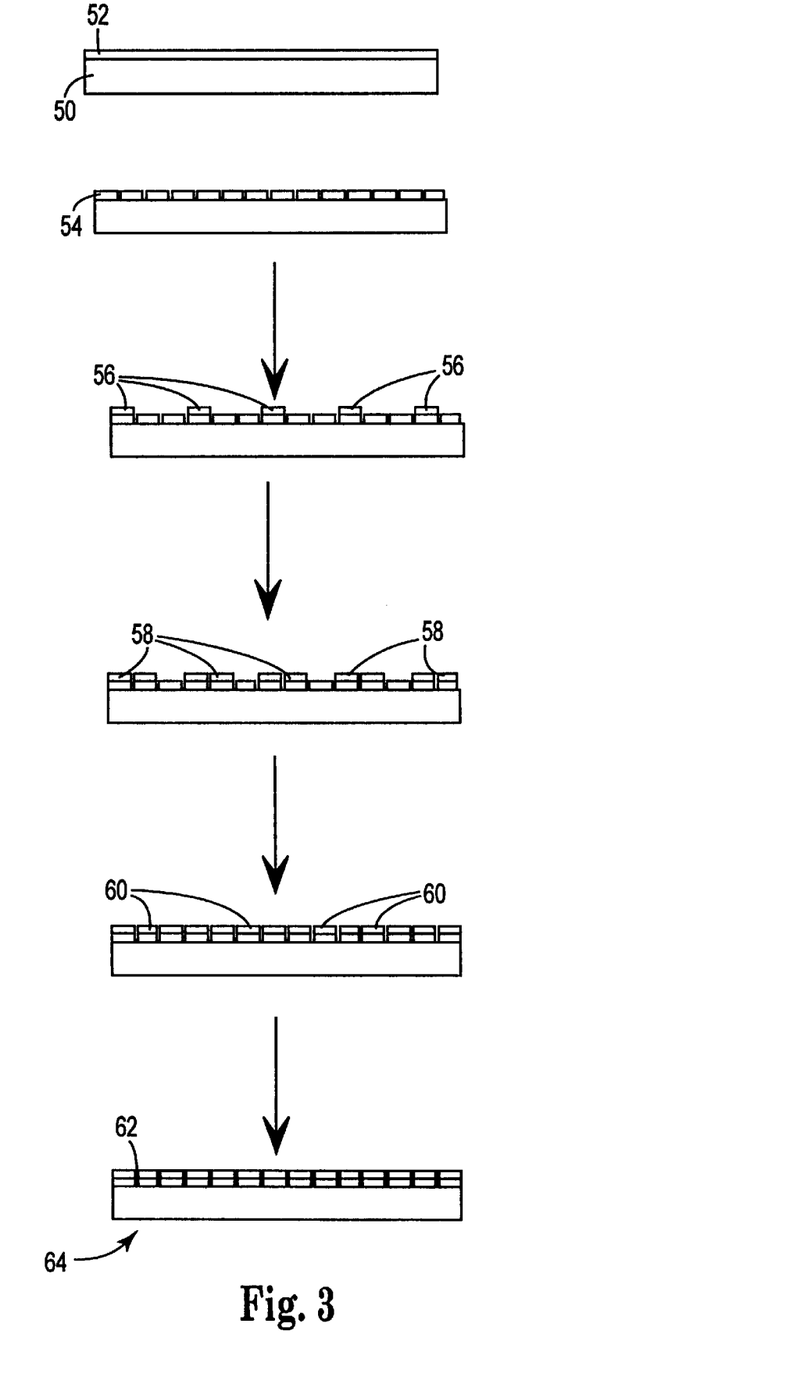
FIG. 3 is a schematic representation of the process steps used to produce a color filter element by an electrophoretic toning process.

In step 1, a glass substrate 50 with a low conductive ITO coating 52 was photolithographically processed to produce an arrangement of ITO conductive electrode strips 54 on the substrate surface. This step may be also be performed, for example, by direct laser milling. In step 2, red color liquid toners 56 are electrophoretically deposited on selected electrodes 54, while in steps 3 and 4, green color liquid toners 58 and blue color liquid toners 60 are deposited on selected electrodes. In step 5, black liquid toners 62 are electrophoretically deposited in the areas between the electrodes 54 to form a black matrix. The resulting construction is a color filter element 64.

Figure 4:
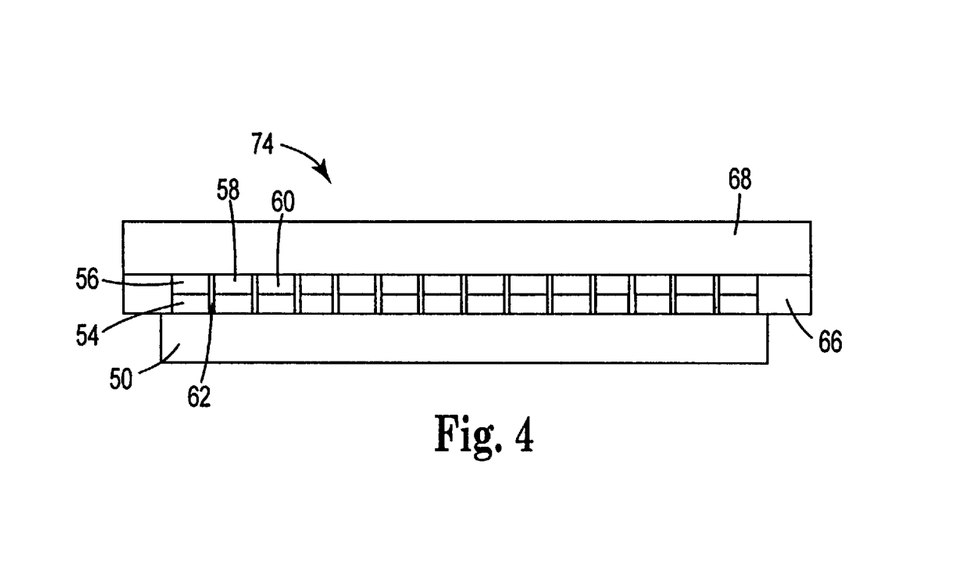
FIG. 4 is an end view of a color filter assembly made from the color filter element of FIG. 3.

II*b*. A 4'×6' (10 cm×15 cm) ITO/Ag/ITO on release layer on a PET substrate made according to Example 1 was overcoated with HAA photopolymer (30% wt., #3) and oven dried at 80° C. for 1 minute. As shown in FIG. 4, the resulting photopolymer film was then pressure laminated to the color filter element 64 prepared in II*a*. The photopolymer film was then UV exposed in the same manner described in Example 2 through the ITO/Ag/ITO side for 2 minutes to form a photopolymer planarization layer. The ITO carrier substrate was peeled away and the ITO layer was properly transferred and adhered on the color filter element 64 to form an actual color filter panel 74. The color filter panel 74 shown in FIG. 4 includes a photopolymer planarization layer 66 and an ITO layer 68. The surface resistivity of the panel 74 was measured to be 10 ohm/square, the same as before transfer.

What is claimed is:

1. A method for the manufacture of an optical element comprising in sequence, a color filter array, a crosslinked organic polymeric layer adhered to said color filter array, and a conductive layer, said process comprising the steps of:
   a) depositing a conductive layer onto a first substrate,
   b) depositing a layer of crosslinkable material onto said conductive layer,
   c) placing the layer of crosslinkable material into contact with the color filter array while said layer of crosslinkable material is in contact with said conductive layer,
   d) curing said crosslinkable material to adhere the layer of crosslinkable material to both the color filter array and the conductive layer, and
   e) stripping said first substrate from said crosslinkable material.

2. The method of claim 1 wherein said first substrate is stripped from said crosslinkable material after step c).

3. The process of claim 2 wherein said conductive layer comprises Indium-Tin-Oxide.

4. The process of claim 3 wherein said crosslinkable material comprises a liquid composition which will crosslink when exposed to a treatment selected from the group consisting of heating and exposure to electromagnetic radiation.

5. The process of claim 4 wherein said crosslinkable material is selected from the group consisting of (meth) acrylates, polysiloxanes, and epoxy crosslinkable materials.

6. The process of claim 2 wherein said conductive layer comprises Indium-Tin-Oxide/Silver.

7. The process of claim 2 wherein said crosslinkable material comprises a liquid composition which will crosslink when exposed to a treatment selected from the group consisting of heating and exposure to electromagnetic radiation.

8. The process of claim 7 wherein said crosslinkable material is selected from the group consisting of (meth) acrylates, polysiloxanes, and epoxy crosslinkable materials.

9. The process of claim 7 wherein said crosslinkable material comprises an ethylenically unsaturated crosslinkable material and photoinitiators.

10. The process of claim 2 wherein said crosslinkable material comprises an ethylenically unsaturated crosslinkable material and photoinitiators.

11. The process of claim 1 wherein said first substrate is stripped from said crosslinkable material after step d).

12. The process of claim 11 wherein said crosslinkable material comprises a liquid composition which will crosslink when exposed to a treatment selected from the group consisting of heating and exposure to electromagnetic radiation.

13. The process of claim 12 wherein said crosslinkable material is selected from the group consisting of (meth) acrylates, polysiloxanes, and epoxy crosslinkable materials.

14. The process of claim 1 wherein said conductive layer is a layer comprising metal, metal oxide, inorganic oxide, or mixtures thereof.

15. The process of claim 14 wherein said crosslinkable material comprises an ethylenically unsaturated crosslinkable material and photoinitiators.

16. The process of claim 11 wherein said crosslinkable material comprises a composition which will crosslink when exposed to a treatment selected from the group consisting of heating and exposure to electromagnetic radiation, said liquid composition at a temperature of 20° C. will flow under shear forces, such that with a 10 cm$^2$ polyester film in contact with the adhesive with a 0.5 lb/sq. in. vertical force component, the polyester film will not move more than 1 cm/sec. with a 200 g horizontal force component applied to the polyester film.

17. A method for the manufacture of an optical element comprising at least a color filter array, a crosslinked organic polymeric layer adhered to said color filter array, and a conductive layer, said process comprising the steps of:
   a) depositing a conductive layer onto a first substrate,
   b) annealing said conductive layer while it is on said first substrate,
   c) depositing a layer of crosslinkable material onto said conductive layer,
   d) placing the layer of crosslinkable material into contact with the color filter array while said layer of crosslinkable material is in contact with said conductive layer,
   e) curing said crosslinkable material to adhere the layer of crosslinkable material to both the color filter array and the conductive layer, and f) stripping the first substrate from the corsslinkable material.

18. The process of claim 17 wherein said crosslinkable material comprises a liquid composition which will crosslink when exposed to a treatment selected from the group consisting of heating and exposure to electromagnetic radiation, said liquid composition at a temperature of 20° C. will flow under shear forces, such that with a 10 cm$^2$ polyester film in contact with the adhesive with a 0.5 lb/sq. in. vertical force component, the polyester film will not move more than 1 cm/sec. with a 200 g horizontal force component applied to the polyester film.

\* \* \* \* \*

UNITED STATES PATENT AND TRADEMARK OFFICE
CERTIFICATE OF CORRECTION

PATENT NO.: 5,858,624

DATED: January 12, 1999

INVENTOR(S): Hsin-Hsin Chou, Michael F. Weber, Cyrus A. Morton, L. peter Erickson It is certified that error appears in the above-identified patent and that said Letters Patent is hereby corrected as shown below:

Claim 17, column 15, line 1, delete "corsslinkable" and insert therefore --crosslinkable--.

Signed and Sealed this

Sixteenth Day of May, 2000

Attest:

Q. TODD DICKINSON

*Attesting Officer*  *Director of Patents and Trademarks*